United States Patent [19]

Kannegundla

[11] Patent Number: 5,440,342
[45] Date of Patent: Aug. 8, 1995

[54] LOGIC SYSTEM AND METHOD FOR CONTROLLING ANY ONE OF DIFFERENT CHARGE COUPLED DEVICE IMAGE SENSORS TO PROVIDE VIDEO IMAGE SIGNALS IN ACCORDANCE WITH A TELEVISION STANDARD

[75] Inventor: Ram Kannegundla, Rochester, N.Y.

[73] Assignee: Eastman Kodak Company, Rochester, N.Y.

[21] Appl. No.: 5,323

[22] Filed: Jan. 15, 1993

[51] Int. Cl.$^6$ .................. H04N 7/01; H04N 5/335
[52] U.S. Cl. ................... 348/294; 348/230; 348/426; 348/441; 348/458; 348/459
[58] Field of Search ............. 358/213.26, 213.11, 358/213.15, 213.16, 213.22, 213.27, 140, 98; H04N 5/335; 348/441, 443, 445, 446, 454, 458, 460

[56] References Cited

U.S. PATENT DOCUMENTS

| | | | |
|---|---|---|---|
| 4,032,975 | 6/1977 | Malueg et al. | 358/213 |
| 4,399,464 | 8/1983 | Hix et al. | 358/213 |
| 4,426,664 | 1/1984 | Nagumo et al. | 358/213 |
| 4,740,828 | 4/1988 | Kinoshita | 358/48 |
| 4,800,435 | 1/1989 | Ikeda et al. | 358/213.19 |
| 4,811,106 | 3/1989 | Burt et al. | 358/213.26 |
| 4,887,153 | 12/1989 | Uehara et al. | 358/98 |
| 4,896,215 | 6/1990 | Morcom | 358/210 |
| 4,928,137 | 5/1990 | Kinoshita | 358/213.26 |
| 4,939,578 | 7/1990 | Kano | 358/213.11 |
| 5,070,406 | 12/1991 | Kinoshita | 358/224 |
| 5,124,796 | 6/1992 | Maki | 358/213.11 |
| 5,184,006 | 2/1993 | Ueno | 250/208.1 |
| 5,255,081 | 10/1993 | Miyamoto et al. | 348/445 |

FOREIGN PATENT DOCUMENTS 63-102580 7/1988 Japan ............... H04N 7/01

*Primary Examiner*—Michael T. Razavi
*Assistant Examiner*—Bipin Shalwala
*Attorney, Agent, or Firm*—James D. Leimbach

[57] ABSTRACT

Apparatus and method for controlling a charge coupled device (CCD) image sensor provides in accordance with a television standard horizontal and vertical CCD control signals. The apparatus includes a frequency generator, a standard timing generator, a pixel clock generator, and a small number of additional timers and logic units which are driven by signals from the generators to generate the vertical and horizontal CCD control signals. The frequency of operation of the pixel clock generator is selectable in accordance with a number of pixels per horizontal line of the CCD image sensor. Various CCD image sensors having different numbers of pixels per horizontal line may be used. The method includes generating a plurality of precisely timed pulses referenced to television standard synchronizing and control signals, and logically combining these pulses and standard signals to generate the vertical and horizontal CCD control signals.

10 Claims, 6 Drawing Sheets

LOGIC SYSTEM AND METHOD FOR CONTROLLING ANY ONE OF DIFFERENT CHARGE COUPLED DEVICE IMAGE SENSORS TO PROVIDE VIDEO IMAGE SIGNALS IN ACCORDANCE WITH A TELEVISION STANDARD

CROSS REFERENCE TO RELATED PATENT APPLICATION

The present invention is related to a co-pending U.S. patent application, Ser. No. 005,326, which is being filed concurrently with the present patent application, is entitled "Apparatus and Method For Controlling A Charge Coupled Device Image Sensor To Provide Sequential Output of Video Image Signals," has a common assignee with the present patent application, and has as its inventor, Ram Kannegundla.

1. Field of the Invention

This invention relates to an electronic logic system and method for controlling any one of a variety of charge coupled device (CCD) image sensors having different resolutions to provide video images in accordance with a given standard for television pictures.

2. Background of the Invention

Recent years have seen the rapid development of CCD image sensors and their present widespread use in television cameras for both amateur and professional applications. Millions of camera units, known as consumer "camcorders", have been purchased by the general public for photographing scenes of everyday life and recording the images on magnetic tape. Because of their small size, electrical efficiency, cost effectiveness, etc., CCD image sensors have become the imaging units of choice not only for consumer camcorders but for more critical uses where even higher picture resolution is needed.

In order to facilitate the display of video images produced by a CCD sensor on a standard television (TV) receiver, for example, it is desirable for the CCD sensor to operate in accordance with the same "standard" that the TV receiver uses. In the United States and a number of other countries the "standard" used for TV is that established by the national television standards committee (NTSC). In Great Britain, Germany, and certain other countries the "standard" is PAL ("phase alternation by line"), while in France and many countries in Eastern Europe the "standard" is SECAM ("sequential chrominance and memory"). While there are differences among the various standards, they all require the display of TV pictures in the form of rapidly scanned horizontal lines of vertical frames. Each vertical frame of a picture represents an instantaneous "snapshot" of the scene being imaged and the frames are displayed in rapid succession as in a motion picture. To further minimize visually apparent flicker in the displayed pictures, each frame thereof is made up of an "odd" and an "even" field superimposed on each other in rapid succession. The horizontal scan lines of an "even" field are precisely interlaced with the horizontal scan lines of an "odd" field, and so on. The NTSC "standard" specifies "525" horizontal scan lines per vertical frame, with "262 ½" lines for each of the "odd" and the "even" fields. This seemingly complicated way of displaying television images is an outgrowth of the development of commercial broadcast television over the past fifty years to the present time. However, this way has served the test of time and is not easily departed from. A much more complete discussion of television (for black and white as well as color) together with the timing, blanking, synchronizing (sync) signals, etc. required by the NTSC "standard" is given in a book entitled *Basic Television and Video Systems*, by Bernard Grob, published by McGraw-Hill, Inc., Fifth Edition, 1984.

CCD image sensors are well known in the art. Briefly described, a CCD image sensor has horizontal lines and vertical columns of light-sensing (detectors) cells closely spaced within a given area onto which an image of a scene is optically focused. Byway of example, there may be hundreds of such cells in each vertical column and even more cells in each horizontal line for a total of hundreds of thousands of cells within an area which may be only a few square centimeters. Each cell represents a very small area, termed a pixel, of the total image; the more pixels present in the CCD image sensor, the finer the resolution (or apparent lack of grain) in the image reproduced by the CCD image sensor.

A CCD image sensor may have at the beginning of each horizontal line of cells a small number of cells (termed "Z ref" cells) used for determining a zero signal level. Then there are a large number of "active" cells in the line for producing pixel image signals, and finally near the end of the line there are a small number of cells (termed "D ref" cells) for determining a "dark" signal reference level, and several additional "Z ref" cells. One such CCD image sensor commercially available from the Eastman Kodak Co. has a total of 791 cells with 768 "active" cells in each horizontal line, with 9 "Z ref" cells at the beginning of the line, and following the "active" cells 12 "D ref" cells, followed by 2 "Z ref" cells at the end of the line, a total of 791 cells. There are 484 horizontal lines of these cells arranged in vertical columns. Other CCD image sensors with fewer or Greater numbers of active cells per horizontal line are similarly available commercially.

The cost of a CCD image sensor rises steeply as the total number of cells per area is increased. There is thus a trade-off in cost versus performance and degree of resolution for a Given sensor. CCD image sensors with lower resolution and much lower cost are used in certain applications (e.g., low priced consumer camcorders), whereas CCD image sensors with higher resolution and greater cost are used in other applications where performance is more important than low cost.

The operation of a CCD image sensor is well known in the art. The active cells of the sensor have their stored image signals (each of which corresponds to the light intensity of a small portion of an image) "read" out pixel by pixel, line by line to provide an electronic video image of a scene. Associated with each column of cells in a CCD image sensor is a separate vertical shift register. In accordance with a broadcast standard for television pictures, (for example, the NTSC "standard"), all of odd-numbered horizontal lines of an image produced by a CCD image sensor are first read out, and then all of even-numbered lines are read out, and so on. Thus at a selected instant of time, the pixel image signals then stored on the cells of the odd-numbered horizontal lines of the CCD sensor are simultaneously shifted into respective memory positions of the vertical shift registers.

The simultaneous shifting of the multitude of individual pixel signals stored in the CCD cells of the odd-numbered lines into the respective vertical registers takes place within a short time termed "vertical blank" interval. The pixel signals thus stored in the vertical registers represent all of the horizontal lines of an "odd"

field of a single frame. The pixel signals stored in all of the vertical registers are next shifted down in parallel at precise intervals within the vertical registers horizontal line by horizontal line and into respective memory positions of a line pixel register (horizontal shift register). There is a memory position in the line pixel register for each one of the vertical registers.

After a single horizontal line of pixels from the vertical registers has been shifted into the line pixel register, the image pixels of that horizontal line are clocked out of the line pixel register by a precisely numbered and spaced cycle of timing pulses (hereinafter termed "pixel clock"). The pixel image signals thus outputted from the line pixel register are applied to other circuitry, such as an analog signal processor (ASP) as is well known in the art. The number of timing pulses in a cycle of the pixel clock corresponds to the number of cells in each horizontal line of cells in the CCD image sensor. Thus sensors with different numbers of cells per horizontal line (for example, 570 cells, or 768 cells) give lower or higher image resolution and require different numbers of pulses in a pixel clock cycle. This will be explained in greater detail hereinafter.

After all of the horizontal lines of pixel image signals of an "odd" field have been shifted into and clocked out of the line pixel register, the pixel image signals stored on the cells of the even-numbered horizontal lines of the CCD image sensor are simultaneously shifted into the vertical registers and the above-described sequence is repeated line by line for an "even" field. This outputting of the "odd" and "even" fields of each frame is repeated continuously at high speed while being precisely synchronized by vertical and horizontal control signals applied to the CCD image sensor.

As is well known, a television frequency sub-carrier signal (hereinafter termed "fsc") provides for the decoding and display in proper sequence of the color-components (e.g., red, green and blue) of standard television image signals. This is also explained in detail in the above-identified book by Bernard Grob. For ease in synchronizing with a television standard the outputting of the pixel image signals in each horizontal line of cells of a CCD image sensor, the number of cells in a horizontal line is made a convenient multiple of the frequency sub-carrier ("fsc"). This will be explained in greater detail hereinafter For the NTSC "standard" the "fsc" is 3.5795 MHz.

The synchronizing (sync) and control signals for a standard television system (e.g., NTSC) are well suited to the needs of cathode ray tube monitors such as used in virtually all present-day television receivers. Generic standard timing generators specifically designed for producing these "standard" sync and control signals are commercially available off-the-shelf at low cost from a number of companies. However, the standard sync and control signals produced by these commercially available timing generators are not directly usable as the vertical and horizontal control signals needed for a CCD image sensor, such as described above.

An imaging system, such as a consumer camcorder, having a CCD image sensor and which must operate in accordance with a television standard, typically uses a generic timing generator for generating "standard" signals to control a video display (with interlaced lines of "odd" and "even" fields for each picture frame). A separate logic circuit is used to provide the vertical and horizontal control signals needed for the CCD image sensor. The separate logic circuit must be synchronized with the timing generator and adds extra cost to the system since it requires added components, some of which are redundant in function with ones already employed in the timing generator. Moreover, the separate logic circuit is normally tailored specifically to the particular CCD image sensor employed in the imaging system. If a different CCD image sensor is to be used (e.g., one having more cells per line and correspondingly higher resolution), a somewhat different logic circuit is necessary.

It is desirable to provide a single, inexpensive and versatile logic system which incorporates all of the features of a television standard timing generator, and which simultaneously provides vertical and horizontal control signals directly applicable with CCD image sensors having different numbers of cells per line.

SUMMARY OF THE INVENTION

In accordance with the present invention, in one aspect thereof, there is provided logic system for controlling a CCD image sensor to produce output video image signals in accordance with a television standard (e.g., the NTSC standard). This new logic system has as a first portion thereof a generic timing generator which produces a number of sync and control output signals as required by the television standard. Among the standard output signals produced by the timing generator are three signals identified respectively as horizontal drive (HD), vertical drive (VD), and "odd" and "even" field indicator (FLD). These three standard signals are applied as inputs to a second portion of the logic system from which are obtained as outputs horizontal and vertical control signals specifically designed for controlling the operations of the CCD image sensor in proper sequence and in synchronism with the television standard signals. The generic timing generator is driven by an oscillator whose frequency is made a convenient multiple (e.g., 12) of a standard frequency sub-carrier (e.g., 3.5795 MHz). A third portion of the logic system provides a selectable pixel clock output which is applied as a fourth input signal to the second portion of the logic system. This third portion of the logic system has applied to its inputs a plurality of frequency signals derived from the oscillator as multiples of the "fsc". By selecting a particular frequency signal (e.g., 4 times the "fsc"), an appropriate number of pixel timing pulses per pixel clock cycle (corresponding to the number of cells per line of the particular CCD image sensor being used with the logic system) is obtained at the output of the third portion. To use a different CCD image sensor with a different number of cells per line merely requires selecting a different frequency signal (e.g., 3 times the "fsc") being inputted to the third portion of the logic system. The components of the second portion of the logic system are a few simple and inexpensive timer and logic units which may be purchased commercially off-the-shelf. This new logic system is inherently synchronized within itself with respect to the standard sync and timing signals produced by the generic timing generator and with respect to the vertical and horizontal control signals for the CCD image sensor produced by the second portion of the logic system.

In accordance with another aspect of the invention, there is provided method for controlling a CCD image sensor to obtain video images for display in accordance with a television standard. The method comprises the steps of generating an oscillating signal having a frequency which is a multiple of a pre-determined standard frequency, generating television standard sync and control output signals synchronized with a multiple of the pre-determined frequency and including a horizontal drive signal, a vertical drive signal, and an "odd" and "even" field indicator signal, generating from a selected multiple of the pre-determined frequency a train of pixel pulses in a pixel clock the number of which pulses per cycle corresponds to the number of cells in a horizontal line of the CCD image sensor, generating a plurality of timed pulses precisely referenced to the horizontal drive signal, the vertical drive signal and the field indicator signal, generating from a logical combination of selected ones of the timed pulses and the pixel clock horizontal control signals for the CCD image sensor, and generating from a logical combination of selected ones of the timed pulses vertical control signals for the CCD image sensor.

In accordance with a further aspect of the invention, there is provided logic system for generating standard synchronizing (sync) and control signals in accordance with a television standard and for generating horizontal and vertical control signals as required by a charge coupled device (CCD) image sensor. The logic system comprises drive means for providing a system signal having a frequency referenced to a standard television frequency sub-carrier (fsc), and timing generator means for generating standard sync and control signals in accordance with a television standard, the generator means being controlled by the drive means. The system further comprises pixel clock generating means for providing a pixel clock having repeating cycles each of which has a pre-determined number of pixel timing pulses in accordance with requirements of the CCD image sensor, the pixel clock generating means being controlled by the drive means; and timing and logic means being driven by ones of the standard sync and control signals for generating horizontal and vertical control signals for the CCD image sensor such that the horizontal and vertical control signals are precisely referenced to the standard sync and control signals, such that the logic system is usable with any one of a number of different CCD image sensors to provide video signals in accordance with a television standard.

In accordance with a still further aspect of the invention there is provided a method for controlling in accordance with a television standard a charge coupled device (CCD) image sensor having a pre-determined number of pixels per horizontal line. The method comprises the step of generating standard synchronizing (sync) and control signals in accordance with a television standard, the step of generating a pixel clock having a selected number of pixel timing pulses during a cycle of the pixel clock, the number of pixel timing pulses being selected in accordance with the pre-determined number of pixels per horizontal line of the CCD image sensor, the step of generating a plurality of precisely timed pulses referenced in duration and time to the standard sync and control signals, the step of generating from a logical combination of the pixel clock and at least one of the timed pulses a horizontal control signal for the CCD image sensor, the step of generating from a logical combination of others of the timed pulses and a field indicator pulse a first vertical control signal for the CCD image sensor; and the step of generating from a logical combination of others of the timed pulses and a standard signal the field indicator pulse and another vertical control signal for the CCD image sensor.

The invention will be better understood from a consideration of the following detailed description given in conjunction with the accompanying drawings and claims.

DETAILED DESCRIPTION

Figure 1:
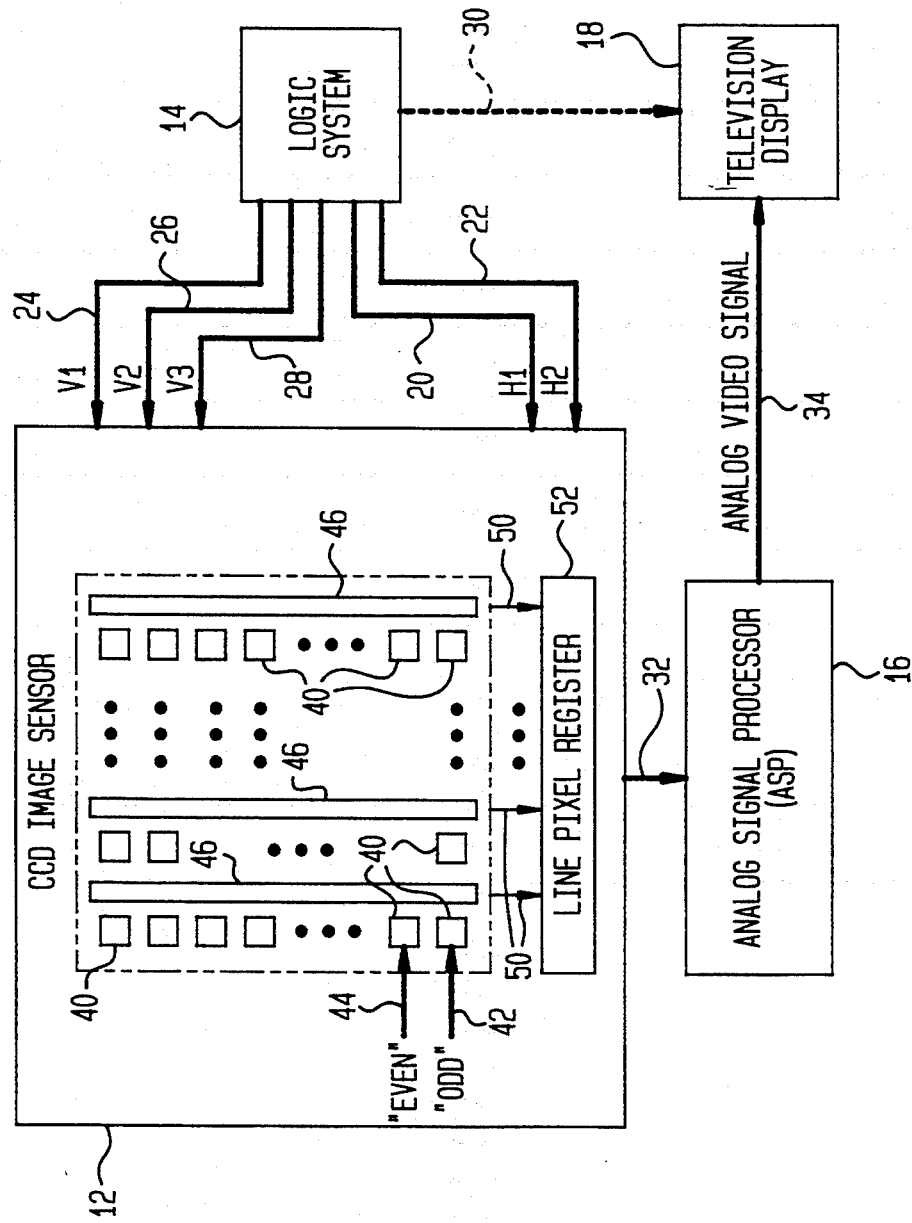
FIG. 1 is a schematic block diagram of a video imaging system in accordance with the present invention.

Referring now to FIG. 1, there is shown a schematic block diagram of a video imaging system 10 in accordance with the present invention. The system 10, by way of example, is operated in accordance with the NTSC standard for television pictures. The system 10 comprises a CCD image sensor 12, (shown within a solid-line rectangle and being well known in the art), a novel logic system 14, an analog signal processor (ASP) 16 also well known, and a conventional television display 18, which may for example be a cathode ray tube (CRT) color video monitor.

The logic system 14, which is described in detail hereinafter, applies horizontal control signals H1 and H2 to the CCD image sensor 12 via respective ones of leads 20 and 22, respectively. The logic system 14 also applies vertical control signals V1, V2 and V3 to the CCD image sensor 12 via respective ones of leads 24, 26 and 28, respectively. Sync and control signals in accordance with the NTSC standard may be applied by the logic system 14 to the television display 18 via a multi-channel cable 30 (shown by a dashed-line). Pixel image signals outputted from the CCD image sensor 12 are applied by a lead 32 to the ASP 16, and analog video signals from the ASP 16 are applied by a lead 34 to the television display 18.

The CCD image sensor 12 has drive circuits (not shown) which are well known in the art and which are controlled by the horizontal control signals H1 and H2 (which are complements of each other). The drive circuits are also controlled by the vertical control signals V1 and V2 (which are complements of each other), and by the vertical control signal V3. These horizontal and vertical control signals, their relationships to each other, and how they are generated by the logic system 14, are described in detail hereinafter.

The CCD image sensor 12, as is well known, has a multitude of closely spaced cells 40 arranged in horizontal lines and vertical columns. A first "odd" horizontal line of cells 40 is indicated by a horizontal arrow 42 and a first "even" horizontal line of cells is indicated by a horizontal arrow 44. Associated with each vertical column of cells is a respective one of vertical shift registers 46 (only three are shown). In each shift register 46 there are memory positions (not shown) adapted to receive at a selected instant all of the pixel image signals of the odd-numbered cells 40 in a given column and subsequently, at a later instant, to receive all of the pixel image signals of the even-numbered cells 40 in that column. This selective, precisely timed shifting of the pixel image signals into the vertical shift registers 46 is described in greater detail hereinafter.

After the vertical registers 46 have been loaded with all of the odd-numbered horizontal lines of pixel image signals, those pixel image signals (corresponding the first "odd" line 42) then in the first memory position (not shown) of the vertical registers 46 are, as indicated by short downward arrows 50, shifted in one cycle in parallel into respective memory positions (not shown) of a line pixel register 52. There is a respective memory position (not shown) in the line pixel register 52 for receiving the output of each one of the vertical registers 46. After the line pixel register 52 has been loaded in a given cycle with the pixel image signals of a single horizontal line (e.g., the first "odd" line 42), the pixel image signals of that line are clocked out of the line pixel register 52 pixel-by-pixel and applied via the lead 32 to the ASP 16. This horizontal readout operation of the line pixel register 52 is controlled by the horizontal control signals H1 and H2 applied to the CCD image sensor 12, as will be explained in detail hereinafter.

The line-by-line shifting into and readout of pixel image signals from the line pixel register 52 continues until, for example, all of the horizontal lines of an "odd" field have been outputted to the ASP 16. At this point the vertical registers 46 are now empty. Then a precisely timed vertical control signal applied to the CCD image sensor 12 simultaneously shifts all of the pixel image signals from the even-numbered lines of cells 40 into the vertical registers 46. Next, the first even-numbered horizontal line of pixel image signals (corresponding to the first "even" horizontal line 44 of the cells 40) is shifted from the vertical registers 46 into the line pixel register 52. After this, the above-described sequence is repeated in clocking the pixel image signals out of the pixel image register 52, line-by-line, until all of the lines of an "even" field have been outputted, and so on. It is important to note that the vertical and horizontal control signals applied to the CCD sensor 12 by the logic system 14 are precisely referenced with respect NTSC standard sync and control signals required by the television display 18. Thus the video signals from the CCD image sensor 12 and the ASP 16 are fully compatible with the television display 18. This desirable result is obtained in a highly effective way by the simple and inexpensive apparatus and method provided by the present invention.

Figure 2:
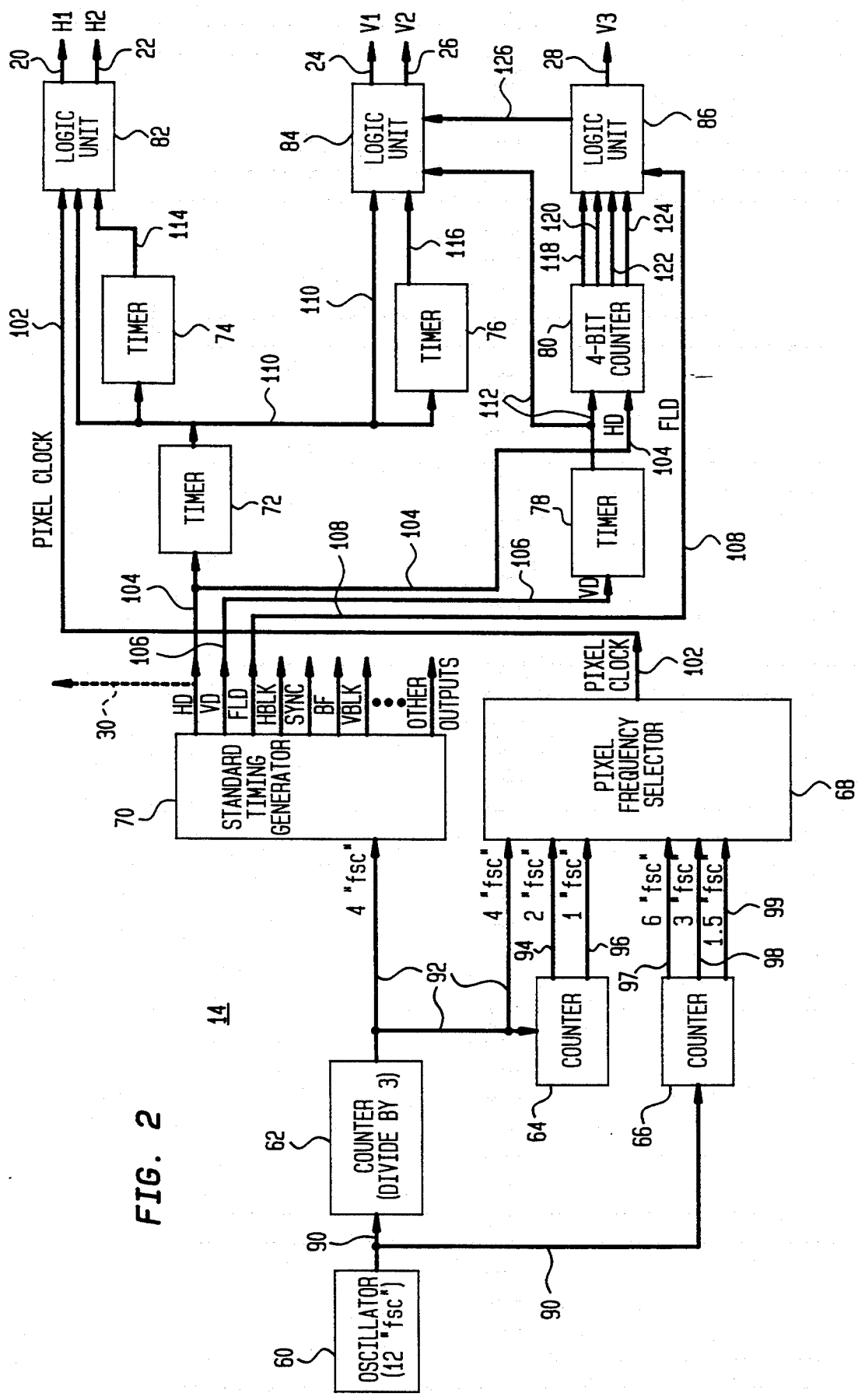
FIG. 2 is an illustrative schematic diagram of a logic system of FIG. 1 in accordance with the present invention.

Referring now to FIG. 2, there is shown a schematic diagram in accordance with the present invention of the logic system 14 of FIG. 1. The logic system 14 comprises an oscillator 60, three counters 62, 64 and 66, a pixel frequency selector 68, a standard timing generator 70, a plurality of timers 72, 74, 76 and 78, a 4-bit counter 80, and a plurality of logic units 82, 84 and 86. By way of example, the sync and control signals generated by the standard timing generator 70 are described hereinafter in accordance with the NTSC standard.

The logic system 14 outputs to the CCD image sensor 12 of FIG. 1 horizontal control signals H1 and H2, via the leads 20 and 22 respectively, and the vertical control signals V1, V2 and V3 via the leads 24, 26 and 28, respectively. Required ones of the sync and control signals generated by the timing generator 70 may be outputted from the logic system 14 to the television display 18 of FIG. 1 by the multi-channel cable 30, indicated as a dashed line.

The oscillator 60 operates at a pre-determined multiple of a standard frequency sub-carrier, shown in FIG. 2 as 12 "fsc". An output signal from the oscillator 60 is connected via leads 90 to an input of the counter 62, and to an input of the counter 66. The counter 62 counts down (i.e., divides by three) the frequency of the input signal (12 "fsc") and applies a signal having a frequency of 4 "fsc" to output leads 92. Leads 92 are connected to an input of the timing generator 70, to an input of the counter 64, and to an input of the pixel frequency selector 68. The timing generator 70 is thus synchronized with a four times multiple of the "fsc" which, in accordance with the NTSC standard "fsc" is 14.3182 MHz The counter 64 counts down by factors of two and applies via an output lead 94 a signal having a frequency of 2 "fsc", and via an output lead 96 a signal having a frequency of 1 "fsc" to respective inputs of the pixel frequency selector 68. Similarly, the counter 66 counts down by factors of two and applies to respective inputs of the pixel frequency selector 68 signals of frequencies of 6 "fsc", 3 "fsc", and 1.5 "fsc" via respective leads 97, 98 and 99, respectively. The pixel frequency selector 68 has an internal switch (not shown) by which a given one of the input signals on the leads 92, 94, 96, 97, 98 and 99 is selected to correspond with the number of cells 40 in a horizontal line of the CCD image sensor 14. By way of example, a lead 92 is selected with its signal of 4 times "fsc" (i.e., 14.3182 MHz) when the CCD image sensor 12 has 791 cells 40 per horizontal line. A different input lead to the pixel frequency selector 68 providing a signal having a correspondingly different multiple of the "fsc" is selected when the CCD image sensor 12 used in the imaging system 10 of FIG. 1 has a different number of cells 40 per horizontal line.

The pixel frequency selector 68 generates a pixel clock, described in detail hereinafter, which is outputted onto a lead 102. During each cycle of the pixel clock the pixel frequency selector 68 generates a train of pixel pulses, which, as was explained previously, correspond in number to the number of cells 40 in a horizontal line thereof in the CCD image sensor 12. The pulses of the pixel clock applied to the lead 102 are, as will be explained hereinafter, precisely referenced to each other and to the beginning and ending of each horizontal line of pixel image signals from the line pixel register 52 of FIG. 1 in accordance with the television (NTSC) standard.

The standard timing generator 70 (which may be purchased off-the-shelf at low cost) generates a number of sync and control signals and applies them to respective output leads. Principal ones of these signals are identified here as: "horizontal drive" (HD), "vertical drive" (VD), "odd and "even" field indicator" (FLD), "horizontal blank" (HBLK), "synchronizing" (SYNC), "burst flag" (BF), and ""vertical blank"" (VBLK). Other signals not specifically identified herein may also be generated by the generator 70. Certain ones of the identified signals HD, VD, FLD, etc. and their time relationships to other signals generated by the logic system 14 are described in greater detail hereinafter.

The HD signal from the timing generator 70 is applied via leads 104 to an input of the timer 72 and to one input of the 4-bit counter 80. The VD signal from the timing generator 70 is applied via a lead 106 to an input of the timer 78. The FLD signal from the timing generator 70 is applied via a lead 108 to one input of the logic unit 86. The pixel clock from the pixel frequency selector 68 is applied via the lead 102 to one input of the logic unit 82. An output of the timer 72 is applied via leads 110 to another input of the logic unit 82, to an input of the timer 74, to one input of the logic unit 84, and to an input of the timer 76. An output of the timer 78 is applied via leads 112 to one input of the 4-bit counter 80 and to one input of the logic unit 84. An output of the timer 74 is applied via a lead 114 to another input of the logic unit 82. An output of the timer 76 is applied via a lead 116 to another input of the logic unit 84. Four outputs of the 4-bit counter 80 are applied by respective ones of leads 118, 120, 122 and 124 to separate inputs of the logic unit 86. An output of the logic unit 86 is applied via a lead 126 to another input of the logic unit 84. The operation of the portion of the logic system 14 comprising the timers 72, 74, 76 and 78, the 4-bit counter 80, and the logic units 82, 84 and 86 will be described in greater detail hereinafter. These components individually are well known in the art and may be purchased off-the-shelf at low cost.

Figure 3:
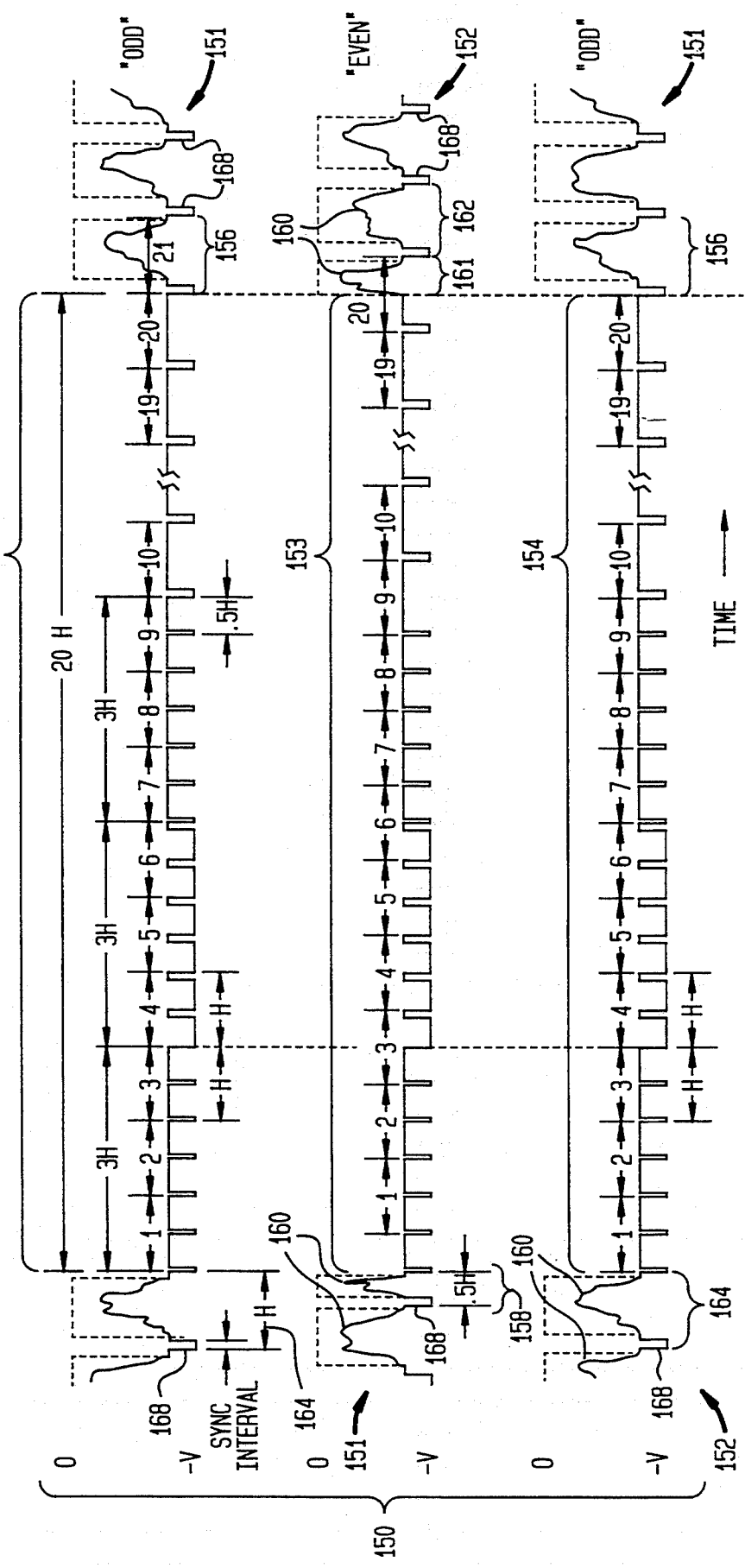
FIG. 3 is a schematic diagram of video image signals provided in accordance with the NTSC standard.

Referring now to FIG. 3, there is shown, by way of background explanation, a television signal schematically indicated at 150 and provided in accordance with the NTSC standard. A much more complete discussion of television signals is to be found in the above-identified book by Bernard Grob. Time is indicated here along a horizontal axis and relative signal amplitude in volts along a vertical axis. The signal 150 is displayed sequentially line-by-line as an "odd" field indicated at 151, an "even" field indicated at 152, and "odd" field at 151, and so on. It is noted that only the beginning and ending portions of the "odd" and "even" fields are shown. The end of an "odd" field 151 and a next "even" field 152 are separated by a """"vertical blank"""" interval indicated at 153, and the end of an "even" field 152 and a next "odd" field 151 are separated by a "vertical blank" interval 154. Various synchronizing pulses shown during the "vertical blank" intervals 153 and 154 are well known in the art and are not further described herein.

During each "vertical blank" interval 153 or 154 twenty horizontal lines "H" (20H) of the video portion of the signal 150 are blanked out. This provides time for vertical retrace from the end of one field to the beginning of the next, and so on. There are "262 ½" horizontal lines H in each of the fields 151 and 152 for a total of "525" lines in a vertical frame of the television picture. The frames are repeated 30 times a second, with the two fields thereof repeated at 60 times per second.

Beginning with the twenty-first line H, as indicated at 156, of an "odd" field 151, two hundred forty two full lines of the television signal 150 are displayed, followed by one half of a line H indicated at 158 at the end of an "odd" field 151. The video portion of the signal 150 during a horizontal line is indicated at 160. At the end of an "odd" field there is another "vertical blank" interval 153 followed by one-half of the twentieth line H indicated at 161 of the next "even" field 152. This half-line 161 is followed by a full twenty-first line, as indicated at 162, of the "even" field, and so on. Each "even" field ends in a full line, as indicated at 164, and then another "vertical blank" interval 154 begins. The time duration of a full line H, such as indicated at 156, 162 and 164, is termed "one line time". Each line H is initiated by a horizontal line sync pulse 168 applied during a very short "sync interval". It is to be noted that the horizontal line sync pulses 168 for each "odd" field are offset by a half line-time with respect to the line sync pulses 168 for an "even" field. Thus an "odd" field 151 ends with a half-line as indicated at 158 and an "even" field 152 begins with a half-line as indicated at 161, and so on.

Figure 4:
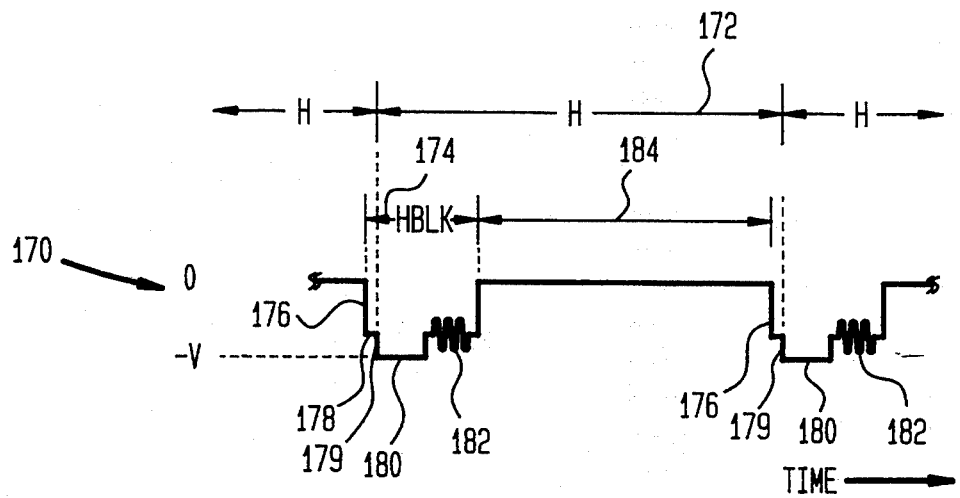
FIG. 4 is an actual waveform illustrating portions of a video signal for one standard horizontal line of a vertical frame.

Referring now to FIG. 4, there is shown greatly enlarged a waveform 170 of the end of one horizontal line H of a television signal (e.g., the signal 150 of FIG. 3), the following full horizontal line H of the signal from beginning to end, and the beginning portion of the next line H. Time is indicated to scale along a horizontal axis, and arbitrary signal voltage amplitude relative to zero along a vertical axis. For the sake of illustration here, the video portion (e.g., the portion 160 of FIG. 3) of the waveform 170 is shown at zero amplitude. The time duration of one line (H) is indicated at 172. This time 172 corresponds to the duration of the full lines 156, 162 and 164 of FIG. 3. In accordance with the NTSC standard, the line time 172 is 63.5 microseconds.

Shortly before the beginning of a line H there is an interval termed "horizontal blank" (HBLK) as indicated at 174. During the HBLK interval 174 there is a combined pulse 176. The combined pulse 176 has a level at 178 at which blanking of the video portion 160 of the television signal 150 (FIG. 3) occurs. The pulse 176 has a transition 179 to a sync pedestal 180, which corresponds to a horizontal sync pulse 168 (FIG. 3). At the end of the sync pedestal 180 the combined pulse 176 has a short oscillating portion 182, termed "burst flag" (BF) by which the color components of the video signal are decoded. The BF portion 182 comprises a number of oscillations of the standard frequency sub-carrier "fsc", as is well known in the art. A BF signal, like the BF portion 182, is generated by the timing generator 70. After the HBLK interval 174 there is an active portion 184 of the line H extending to the next HBLK interval 174, during which video image signals (not shown here) are displayed. The active line portion 184 has a time of 55.31 microseconds according to the NTSC standard. The video pixel image signals, (e.g., the video portion 160 of FIG. 3), are outputted, as was explained previously, from the line pixel register 52 of FIG. 1 pixel image signal by pixel image signal corresponding to a horizontal line of cells 40 in the CCD image sensor 12. To obtain from the CCD image sensor 12 properly synchronized signals for each line (such as illustrated, at 156, 158, 161, 162 and 164 in FIG. 3), it is essential that the pixel clock applied to the lead 102 (FIG. 2) have the proper number of pixel timing pulses (corresponding to the number of cells 40 in a horizontal line) and that each cycle of the pixel clock be precisely referenced to the line time 172, and to the active line interval 184 of FIG. 4. Also, during each HBLK interval 174, a horizontal line of pixel image signals must be shifted at a precisely synchronized instant from the vertical registers 46 of the CCD image sensor 12 of FIG. 1 into the line pixel register 52 of FIG. 1.

Figure 5:
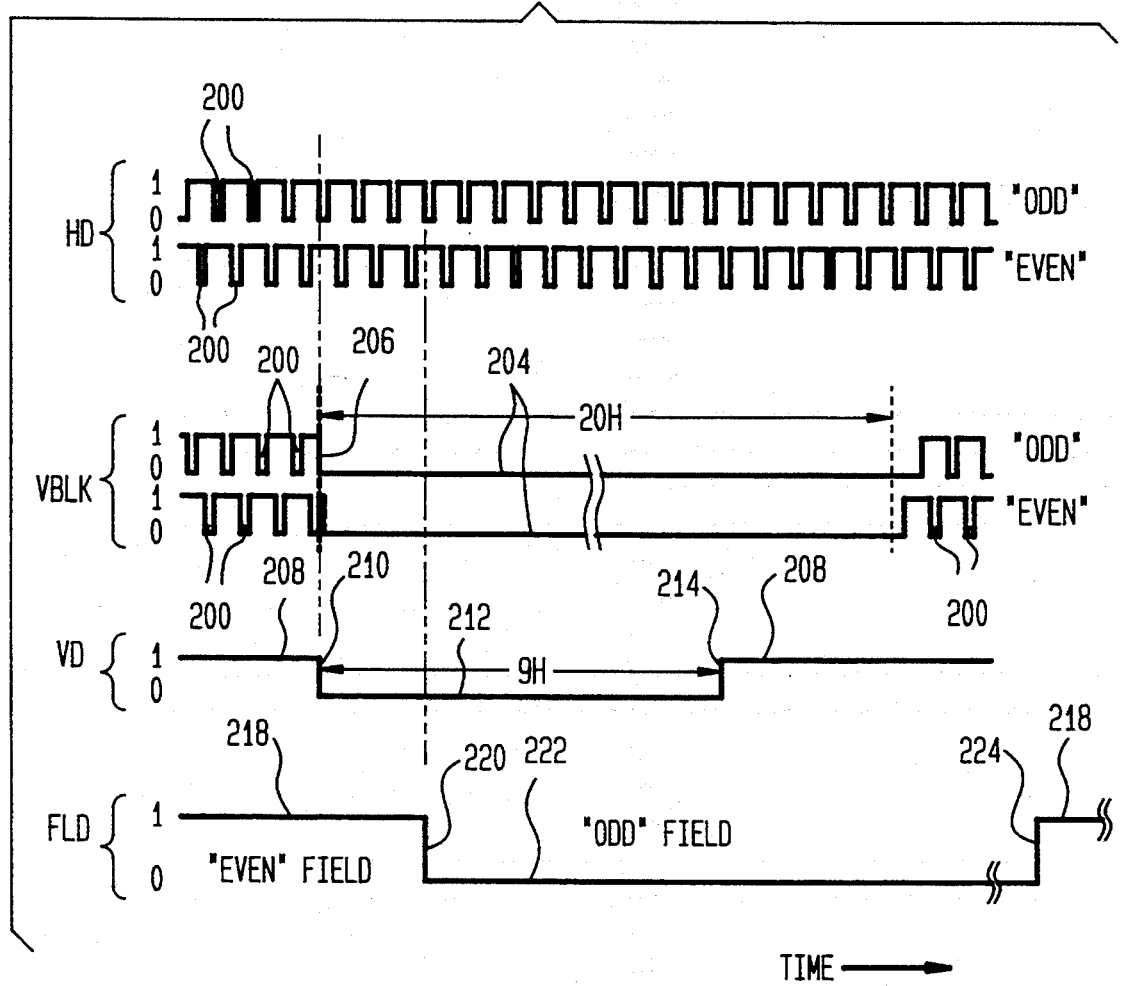
FIG. 5 shows in schematic form certain standard sync and control signals generated by a timing generator in accordance with the NTSC standard.

Referring now to FIG. 5, there are schematically shown certain of the standard output signals generated by the timing generator 70 of FIG. 2. Time is indicated along a horizontal axis and signal logic levels of binary "0" and "1" along a vertical axis. Because such signals are well known they are only briefly described herein. A first one of the signals shown here is the horizontal drive (HD) signal which (see also FIG. 2) is applied to the lead 104. The HD signal comprises a series of sync pulses 200 which are evenly spaced by "one line time" (i.e., the time 172 of FIG. 4) and which correspond to the horizontal sync pulses 168 (FIG. 3). It is noted that the HD sync pulses 200 shown here for an "even" field are offset by one-half of the line time relative to the HD sync pulses 200 for an "odd" field. This conforms with the evenly spaced timing of the standard horizontal sync pulses 168 previously described (FIG. 3).

A "vertical blank" (VBLK) signal generated by the timing generator 70 (applied to an output lead identified as VBLK in FIG. 2) has a twenty-line (20H) blanking interval indicated at 204 for both the "odd" and "even" fields. The blanking intervals 204 begin at a transition indicated at 206 and are referenced to the HD sync pulses 200 for the "odd" and "even" fields, as shown. These blanking intervals 204 correspond to the standard vertical blank intervals 153 and 154 (FIG. 3).

A vertical drive (VD) signal (applied to the lead 06 in FIG. 2) has a first level (logic "1") indicated at 208 which at a transition 210 goes to a second level (a logic "0") 212. The transition 210 is matched in time with the transition 206 of the VBLK signal. The second level 212 of the VD signal has a duration of nine line-times (9H) after which the VD signal at a transition 214 returns to the first level 208.

An "odd" and "even" field indicator (FLD) signal (applied to the lead 108 in FIG. 2) has a first level (logic "1") 218 (indicating an "even" field) which at a first transition 220 goes to a second level (logic "0") 222 (indicating an "odd" field). At the end of an "odd" field the FLD signal goes from the second level 222 at a second transition 224 back to the first level 218. The first transition 220 of the FLD signal occurs three line-times after the transition 210 of the VD signal, as does the second transition 224.

Synchronizing (SYNC) signals generated by the timing generator 70 and applied to an output lead (identified as SYNC in FIG. 2) are not shown herein but correspond to the standard sync pulses 168 and other sync pulses (not numbered) within the "vertical blank" intervals 153 and 154 (FIG. 3). Similarly, other signals generated by the timing generator 70 are not illustrated herein but are well known in the art.

Figure 6:
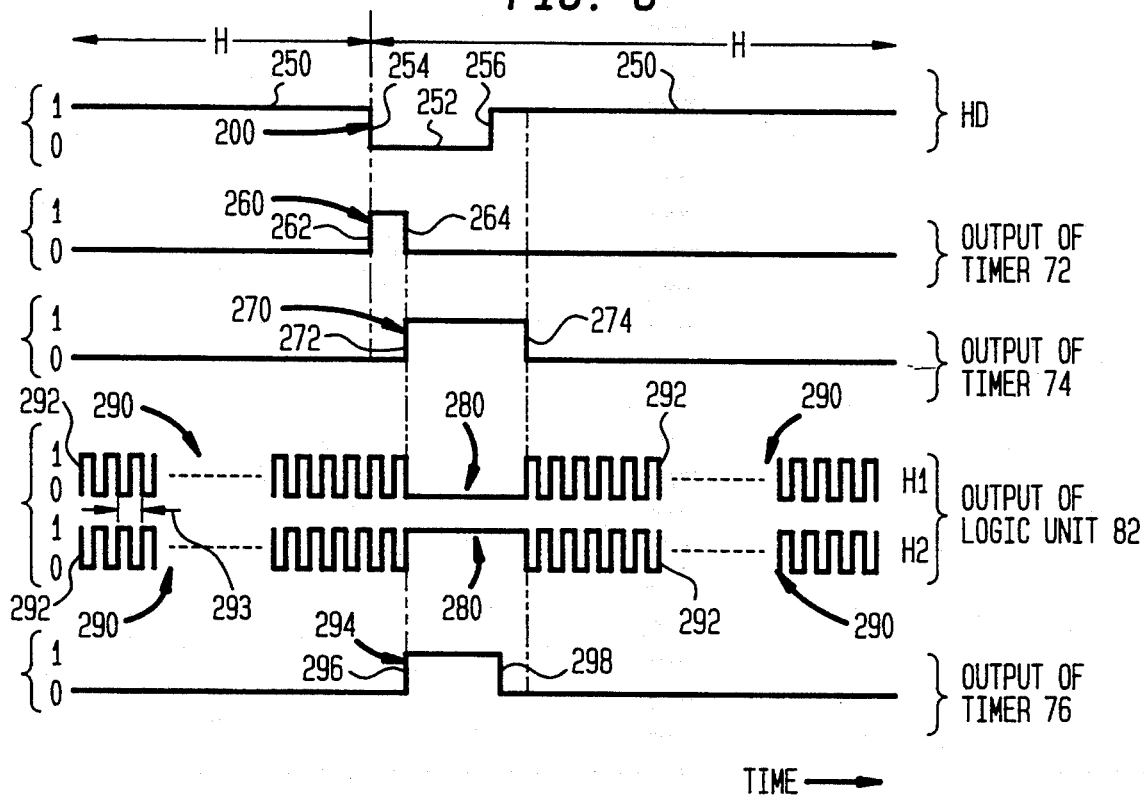
FIG. 6 is a schematic illustration of certain timed pulses and shows a logical combination of pulses and a pixel clock to provide horizontal control signals in accordance with the invention for a CCD image sensor of FIG. 1.

Referring now to FIG. 6, there are shown in schematic form some important time relationships of various signals and timed pulses generated within the logic system 14 of FIG. 2. Time is along a horizontal axis and signal logic levels of "0" and "1" along a vertical axis. A single sync pulse 200 of the HD signal (see also FIG. 5) is shown going from a first (logic "1") level 250 to a second (logic "0") level 252 at a transition 254 and then at a later transition 256 back to the level 250. The transition 254 marks the beginning of the next line H and the end of the previous line, as indicated. The exact relationship of the sync pulses 200 of the HD signal to the standard sync pulses 168 of FIG. 3, the HBLK intervals 174 (FIG. 4), and the VBLK intervals 204 of FIG. 5 has previously been described.

Shown positioned below the sync pulse 200 is a precisely timed pulse 260 which is generated by the timer 72 of FIG. 2 at the beginning of each HD signal pulse 200. The timed pulse 260 begins at a transition 262 (coincident with the transition 254) and ends shortly afterward at a transition 264 even though the sync pulse 200 is still present (i.e., at level "0"). The pulse 260 is applied to the lead 110 of FIG. 2.

The trailing edge (transition 264) of the timed pulse 260 triggers the timer 74 of FIG. 2, which produces a timed pulse 270. The pulse 270 begins at a transition 272 and ends at a transition 274. It will be noted that the transition 272 occurs at the same time as does the transition 264, and that the transition 274 occurs somewhat after the transition 256 of the HD sync pulse 200. Thus the timed pulse 270 (which is applied via the lead 114 to an input of the logic unit 82 in FIG. 2), begins only after a precisely set interval (determined by the pulse 260) after a HD sync pulse 200 occurs. The timed pulse 270 continues for a precisely set interval (determined by the timer 74) until shortly after the HD sync pulse 200 has ended.

The pulses 260 (from timer 72), the pulses 270 (from timer 74), and the pixel clock on the lead 102 (FIG. 2) are logically combined, in a way well known in the art, in the logic unit 82 to produce an output horizontal control signal H1 and its complement H2. As schematically illustrated in FIG. 6, the horizontal control signal Hi (with logic levels "0" and "1"), and the complementary horizontal control signal H2, (with logic levels "0" and "1") has a "blanked-out" portion 280 during which the pixel clock indicated at 290 is interrupted. The pixel clock 290 comprises evenly spaced pixel timing pulses 292. The pixel timing pulses 292 are in the form of a square wave having a 50% duty cycle and a period indicated at 293. For a drive signal of 4 "fsc" applied to the pixel frequency selector 68, the period 293 is "one" divided by 4 "fsc". Each timing pulse 292 in the horizontal control signals H1 and H2 drives the line pixel register 52 of FIG. 1 to output a single pixel image signal. There are provided here as many timing pulses 292 in a single cycle of the horizontal control signals H1 and H2 as are required to output from the line pixel register 52 all of the active pixel image signals as well as the beginning and ending "D ref" and "Z ref" signals from a horizontal line of cells 40 of the CCD image sensor 12. The exact position and duration of the "blanked-out" intervals 280 within the horizontal control signals H1 and H2 are referenced as shown to the HD sync pulses 200. The frequency (e.g., 4 "fsc") selected by the pixel frequency selector 68 for the pixel clock on the lead 102 determines the number of pixel timing pulses 292 provided in the horizontal control signals H1 and H2.

Shown below the horizontal control signals H1 and H2 of FIG. 6 is a timed pulse 294 (with logic levels of "0" and "1"). Pulse 294 (generated by the timer 76 of FIG. 2) begins at a transition 296 which coincides with the transition 264 at the end of the pulse 260. The pulse 294 ends at a transition 298 which occurs shortly before the transition 274 at the end of the pulse 270 from the timer 74. The interval defined by the pulse 294 is thus precisely referenced to the HD signal pulse 200, to the timed pulse 260 (timer 72) and to the interval 280 of the horizontal control signals H1 and H2.

During the interval of each pulse 294, a single horizontal line of pixel image signals in the vertical registers 46 of the CCD image sensor 12 of FIG. 1 is shifted into the line pixel register 52 of FIG. 1. The pulses 294 are hereinafter referred to as "vertical shift" pulses 294. A precisely numbered sequence of the vertical shift pulses 294 comprises a vertical clock (to be described shortly) having "odd" field and "even" field cycles. There are as many of the vertical shift pulses 294 in an "odd" field cycle of the vertical clock as there are odd-numbered horizontal lines of pixel image signals of the CCD image sensor 12 to be shifted line-by-line into the line pixel register 52 of FIG. 1. The same applies for the "even" field cycle of the vertical clock and the even-numbered horizontal lines of the CCD image sensor 12. Byway of example, where the CCD image sensor 12 has "484" horizontal lines of cells 40, there are "242" odd-numbered lines and "242" even-numbered lines, as was explained previously. In accordance with the NTSC standard, the first 20 lines of each field of "262 ½" lines are "blanked out" during vertical retrace. Neglecting the half lines, there are "242" full lines of each field ("odd" or "even") to be accounted for. And of course, the timing of these lines must be such that the "odd" and "even" fields are properly interlaced when displayed on a standard monitor (e.g., the television display 18 of FIG. 1). This is automatically accomplished in the logic system 14 by referencing the vertical shift pulses 294 to the HD sync pulses 200, as shown.

Figure 7:
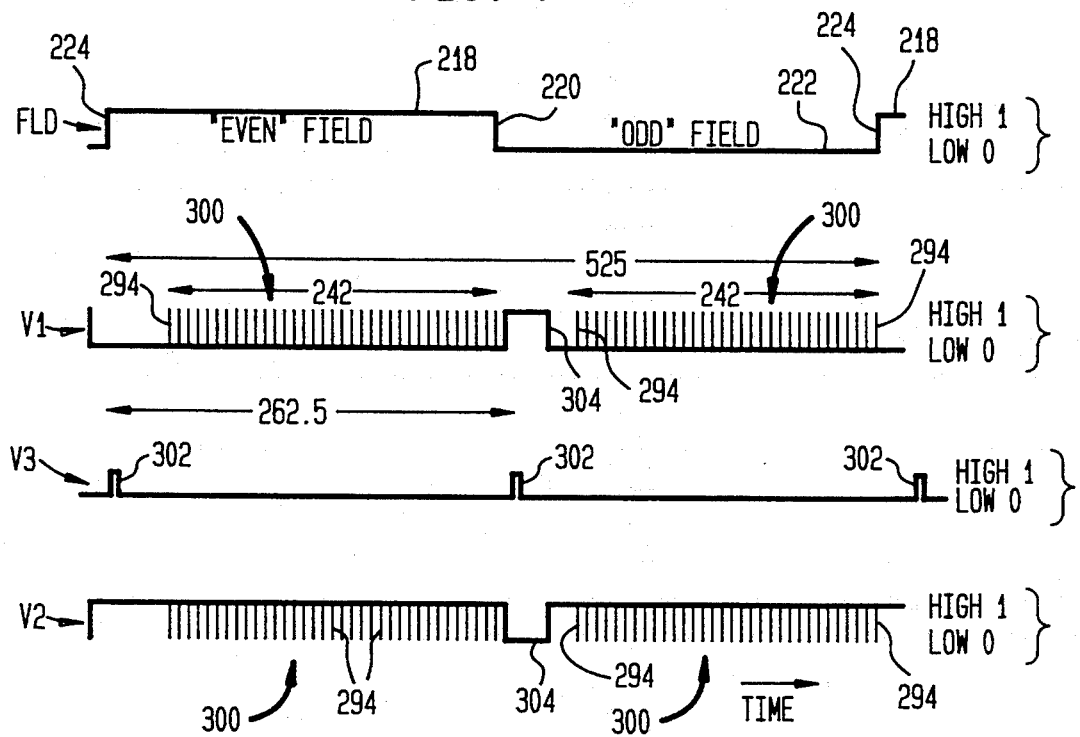
FIG. 7 is a schematic illustration of vertical control signals provided in accordance with the invention for the CCD image sensor of FIG. 1.

Referring now to FIG. 7, there is shown (not to scale) the time relationship of various signals generated by the logic system 14 of FIG. 2. Time is indicated along a horizontal axis and logic levels "high" (logic 1) and "low" (logic 0) along a vertical axis. The FLD signal generated by the standard timing generator 70 is shown here with an "even" field level 218 and an "odd" field level 222, and so on. The time relationship of the FLD signal to the HD signal and the VD signal has previously been described and shown in FIG. 5. Following the example given above, an "odd" and "even" field together comprise "525" lines, as indicated.

Shown positioned in FIG. 7 below the FLD signal are the vertical control signals V1 and V2. These signals are generated by the logic unit 84 of FIG. 2 and are complements of each other. A vertical clock indicated at 300 in each of the vertical control signals V1 and V2, comprises a precisely referenced sequence of the vertical shift pulses 294 of FIG. 6, as was previously explained. Following the example given above there are shown here "242" vertical shift pulses 294 (only a representative number of pulses are actually shown) for each "odd" and each "even" field. The vertical control signal V3 (as generated by the logic unit 86) and arbitrarily shown between the vertical control signals V1 and V2, comprises evenly spaced pulses 302 which effect the shifting of the odd-field and even-field lines of pixels into the vertical registers 46, as will be explained shortly.

It will be noted that a pulse 304 appears in the odd-field portion of the vertical control signal V1, and as a complement in the vertical control signal V2. There is no pulse 304 in an "even" field of the vertical control signals V1 and V2.

The pulses 302 of the vertical control signal V3 are generated by the logic unit 86 of FIG. 2 and are referenced to the signals V1 and V2, as will be explained shortly. When an "odd" field of the vertical control signals V1 and V2 (with their complementary pulses 304) appears, a pulse 302 of the vertical control signal V3 (also being applied to the CCD image sensor 12 of FIG. 1) causes the simultaneous shifting of all of the odd-numbered (but not the even-numbered) horizontal lines of pixel image signals from the cells 40 into the vertical registers 46. Then (after a pre-determined interval) a first one of the vertical shift pulses 294 occurring next in the "odd" field portion of the vertical control signals V1 and V2 shifts the first odd-numbered horizontal line (e.g., the "odd" line 42 of FIG. 1) of pixel image signals into the line pixel register 52 of FIG. 1. Thereafter, the previously described line-by-line cycle of vertical shifting into and readout from the line pixel register 52 continues until all of the lines of the "odd" field are outputted.

When an "even" field of the vertical control signals V1 and V2 next appears, a pulse 302 of the vertical control signal V3 causes the simultaneous shifting of all of the even-numbered (but not the odd-numbered) lines of pixel image signals into the vertical registers 46. Thereafter the above-described sequence of vertical shifting and horizontal readout continues until all of the lines of an "even" field have been outputted from the CCD image sensor 12 of FIG. 1, and so on, field after field.

Figure 8:
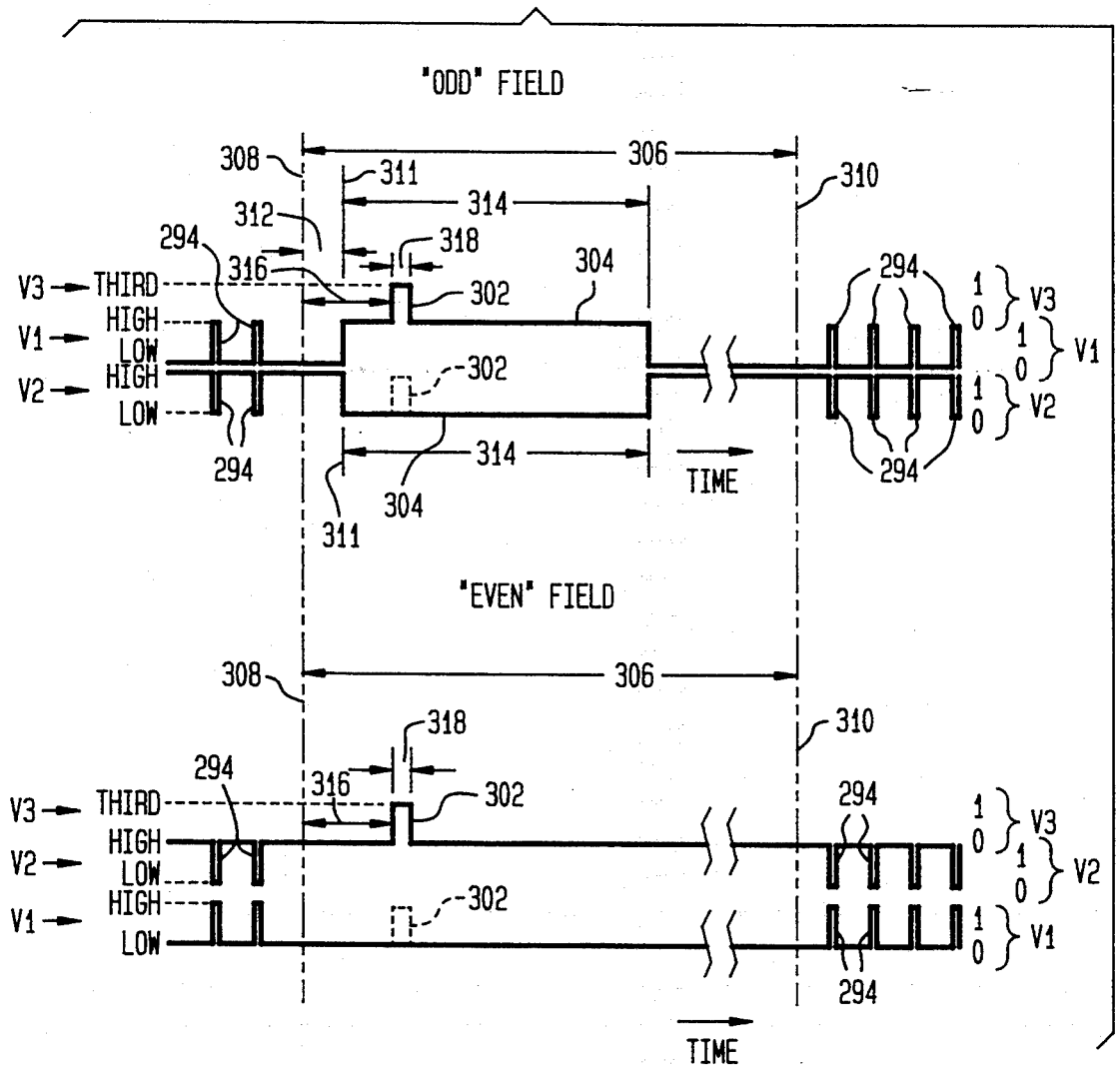
FIG. 8 shows enlarged portions of the vertical control signals of FIG. 7 and schematically illustrates the relation of the vertical control signals with respect to each other and the "odd" and "even" fields thereof.

Referring now to FIG. 8, there are, for ease of explanation, schematically shown further enlarged (relative to FIG. 7) the beginning portion of the "odd" field and the beginning portion of the "even" field of the vertical control signals V1 and V2. The pulses 302 of the vertical control signal V3 are also shown in relation to the signals V1 and V2. Time (not exactly to scale) is indicated along the horizontal axis and signal logic levels of "0" and "1" and combined levels illustrating "low", "high" and third" are indicated along the vertical axis. After the last vertical shift pulse 294 (see also FIG. 6) in an "even" field there is a blanked-out interval 306 at the beginning of the next "odd" field of the vertical control signals V1 and V2. The blanked-out interval 306 (determined by the timer 78 as will be explained shortly) begins at a time indicated by a vertical line 308 and ends at a time indicated by a vertical line 310. During the blanked-out interval 306, the vertical sync pulses 294 are eliminated from the vertical control signals V1 and V2. Similarly, after the last vertical sync pulse 294 in an "odd" field of the vertical control signals V1 and V2 there is a blanked-out interval 306 at the beginning of the next "even" field, and so on. Each blanked-out interval 306 is precisely referenced to the HD signal (lead 104) and to the VD signal (lead 106) as will be explained shortly. It should be noted that for the sake of illustration here, the position of the vertical control signal V1 is shown above the position of the signal V2 for the "odd" field, whereas the relative positions of the signals V1 and V2 is reversed for the "even" field.

The pulse 304 (and its complement) occur as shown (see also FIG. 7) within the vertical control signals V1 and V2 during the blanked-out interval 306 of an "odd" field. The pulse 304 begins at a time indicated by a vertical line 311, which occurs after a precise delay indicated at 312 from the beginning at 308 of the blanked-out interval 306. The duration of the pulse 304 is indicated at 314. The pulse 304 serves to distinguish each "odd" field from each "even" field of the vertical control signals V1 and V2 since the blanked-out intervals 306 by themselves do not.

A pulse 302 of the vertical control signal V3 is shown for the sake of explanation superimposed on (though not part of) the odd-field indicator pulse 304 in an "odd" field of the vertical control signal V1. It is noted that a phantom pulse 302 is indicated by the dashed line within the complementary pulse 304 of the odd-field vertical control signal V2, as will be explained shortly. The pulse 302 begins a short interval, indicated at 316, after the beginning at the time 308 of the blanked-out interval 306. The duration of the pulse 302 is indicated at 318. The generation by the logic system 14 of the pulses 302 of the vertical control signal V3, and the pulses 304 and the blanked-out interval 306 of the vertical control signals V1 and V2 will be described in detail hereinafter.

The generating of the pulse 302 of the vertical control signal V3 to occur during the odd-field indicator pulse 304 of the vertical control signal V1 in effect provides, as shown here, a "third" signal-level in addition to the two levels "low" and "high" of the vertical control signal V1 by itself. This permits the drive circuits (not shown) within the CCD image sensor 12 to recognize this pulse 302 of the vertical control signal V3 as a command to shift all of the odd-numbered (but not the even-numbered) lines of pixel image signals into the vertical registers 46.

It is noted, with respect to the "odd" field portion of the vertical control signal V2, that a phantom pulse 302, as shown by the dashed-lines, lies within the envelop of the indicator pulse 304, not on top of it. There is thus, in effect, no "third" level established by the pulse 302 for the "odd" field portion of the vertical control signal V2. The drive circuits (not shown) of the CCD image sensor 12 therefore do not attempt at this time to shift the even-numbered lines of pixel image signals into the vertical registers 46.

The "even" field portion of the vertical control signal V2 (shown here for convenience of explanation with the control signal V2 positioned above the signal V1), has a pulse 302 of the signal V3 superimposed, as shown for the sake of explanation, on the blanked-out interval 306 of the signal V2. Thus there is in effect, a "third" level established by the pulse 302 in addition to the two levels "low" and "high" of the signal V2. A phantom pulse 302, shown by the dashed lines, lies within (not on top of) the blanked-out interval 306 of the "even" field portion of the vertical control signal V1 and hence does not establish a "third" level with respect to it. Therefore, for an "even" field, the pulse 302 of the vertical control signal V3 causes the drive circuits (not shown) of the CCD image sensor 12 to shift all of the even-numbered (but not the odd-numbered) lines of pixel image signals into the vertical registers 46, and so on.

Byway of example, the duration of the blanked-out interval 306 is twenty line-times (20H) and it is referenced to the vertical drive (VD) signal, as will be explained shortly. The duration of the field indicator pulse 304 is eight line-times (8H) and it begins within a line-time after the beginning of the blanked out interval 306, being referenced to the horizontal drive (HD) signal. The pulse 302 of the vertical control signal V3 begins one line-time after the pulse 304 begins, being also referenced to the HD signal. The pulse 302 has a duration of about one line-time. The vertical sync pulses 294 of the vertical control signals V1 and V2 are referenced to the HD signal (FIG. 6). Thus, the first vertical sync pulse 294 appearing after each blanked-out interval 306 ends, occurs at the precise time required for synchronizing each of the "odd" and "even" fields of horizontal lines of the video signal, as was previously explained.

Referring again to FIG. 2, the complementary horizontal control signals H1 and H2 of FIG. 6 are generated by the logic unit 82 (leads 20 and 22) from a logical combination of the pixel clock 290 (lead 102), the timed pulse 260 generated by the timer 72 (lead 110), and the timed pulse 270 generated by the timer 74 (lead 114).

The complementary vertical control signals V1 and V2 of FIG. 7 are generated by the logic unit 84 (leads 24 and 26) from a logical combination of the timed pulse 260 (lead 110), the timed pulse 294 (FIG. 6) generated by the timer 76 (lead 116), a signal (not shown) generated by the timer 78 (lead 112) and having a duration equal to the blanked-out interval 306 (FIG. 8), and a field indicator pulse 304 (FIG. 8) generated by the logic unit 86 and applied to the lead 126.

The 4-bit counter 80 is enabled by the signal (not shown but lasting for the interval 306) generated by the timer 78 on the lead 112. Thereafter, in response to the HD signal on the lead 104, the 4-bit counter 80 generates binary bit pulses (not shown) representing "one" "two" "four" and "eight" line-times on the respective leads 118, 120, 122 and 124. The logic unit 86 receives these binary bit pulses (not shown) and the FDL signal on the lead 108 and logically combines them. In response to the input signals, the logic unit 86 generates the field indicator pulses 304 (lead 126), and the pulses 302 of the vertical control signal V3 (lead 28). The timing and referencing of the pulses 302 of the vertical control signal V3, and the blanked-out intervals 306 and the field indicator pulses 304 of the complementary vertical control signals V1 and V2 have previously been described (FIGS. 7 and 8).

The seemingly complex task of generating "standard" (NTSC) sync and control signals needed by a conventional television display on the one hand, and the generating of precisely referenced though substantially different horizontal and vertical control signals needed by various CCD image sensors on the other hand, is accomplished in a simple and highly effective way by the above described apparatus and method provided by the present invention. The logic system 14 is controlled in absolute synchronism by a single oscillator 60 operating at a pre-determined multiple (e.g., 12) of a standard frequency sub-carrier "fsc". A standard timing generator 70 operates at a smaller multiple (e.g., 4) of the "fsc" to produce standard sync and control signals for a conventional television system. A specially provided pixel frequency selector 68 generates a pixel clock 290 having a number of pixel timing pulses 292 per cycle selected in accordance with the particular CCD image sensor 12 used with the logic system 14. The HD signal, the VD signal and the FLD signal from the standard timing generator 70, and the pixel clock from the pixel frequency selector 68 are then applied to another portion (comprising a small number of inexpensive components which may be purchased off-the-shelf) of the logic system 14. This portion of the logic system 14 generates the horizontal and vertical control signals needed by the CCD image sensor 12, as previously described. These horizontal and vertical control signals are inherently referenced to and synchronized with a television standard (e.g., NTSC). There is no redundancy of elements in this new logic system 14 and thus it is highly cost effective.

The standard timing generator 70 can be Part No. CX-7930A NTSC, PALM, sold by Sony Corporation. It provides output sync and control signals in accordance with the NTSC standard, and also the PAL standard. The timers 72, 74, 76 and 78 are commercially available, for example, from Texas Instruments Co. as part number 74HC123. The logic units 82, 84 and 86 comprising logic gates and inverters are commercially available, for example, from Texas Instruments as part numbers 74HC00, 74HC04, 74HC08, and 74HC32. The pixel frequency selector 68 is a commercially available pulse generator with inputs that are made selectable by a switch (not shown). The various other components employed in the logic unit 14 are well known in the art and are commercially available from a number of suppliers.

Various changes in the apparatus and method disclosed may occur to those skilled in the art and can be made without departing from the spirit and scope of the invention as set forth in the accompanying claims. In particular, the invention is not limited to a given television standard (e.g., NTSC), or to the particular components of the logic system 14 which have been specifically described. Modifications in the sequences of generating the horizontal control signals and the vertical control signals for the CCD image sensor 12 by the logic system 14 may be made without departing from the invention.

What is claimed is:

1. A logic system for generating synchronizing (sync) and control signals in accordance with a television standard and for generating horizontal and vertical control signals as required by a charge coupled device (CCD) image sensor, the logic system comprising:

drive means for providing a system signal having a frequency referenced to a standard television frequency sub-carrier (fsc);

timing generator means for generating standard sync and control signals in accordance with a television standard, the generator means being controlled by the drive means;

pixel clock generating means for providing a pixel clock having repeating cycles each of which has a pre-determined number of pixel timing pulses in accordance with requirements of the CCD image sensor, the pixel clock generating means being controlled by the drive means; and timing and logic means being driven by ones of the standard sync and control signals for generating horizontal and vertical control signals for the CCD image sensor such that the horizontal and vertical control signals are precisely referenced to the standard sync and control signals, such that the logic system is usable with any one of a number of different CCD image sensors to provide video signals in accordance with a television standard;

wherein the drive means is adapted to provide a signal having a frequency of a pre-determined multiple of the "fsc" to the timing generator means and provides a plurality of signals having frequencies of multiples of the "fsc" to the pixel clock generating means; and wherein the pixel clock generating means is adapted to provide a pixel clock in accordance with a selected one of the plurality of signals from the drive means, the signal being selected in accordance with a number of pixel timing pulses required by the CCD image sensor to output a horizontal line of pixel image signals thereof.

2. The logic system of claim 1 wherein the timing and logic means comprises:

a plurality of timers adapted to provide respective pulses of pre-determined durations referenced to ones of the standard sync and control signals;

first logic means for generating the horizontal control signals from a logical combination of the pixel clock and at least one of the respective pulses;

second logic means for generating one of the vertical control signals and an odd-field signal from a logical combination of ones of the respective pulses and the standard sync and control signals; and third logic means for generating another of the vertical control signals from a logical combination of others of the respective pulses.

3. The logic system of claim 1 wherein the plurality of signals from the drive means have frequencies of 1, 1.5, 2, 3, 4 and 6 multiples of the "fsc".

4. A logic system for generating standard synchronizing (sync) and control signals in accordance with a television standard and for generating horizontal and vertical control signals required by a charge coupled device (CCD) image sensor, the logic system comprising:

oscillator means for providing a plurality of signals having respective frequencies of multiples of a standard television frequency sub-carrier (fsc);

a standard timing generator adapted to be driven by a signal from the oscillator means and adapted to provide standard sync and control signals in accordance with a televisions standard;

a plurality of timers adapted to generate signals having respective durations and being precisely referenced to each other and to ones of the standard sync and control signals;

a pixel clock generator adapted to generate a pixel clock, the pixel clock generator being adapted to provide a pixel clock in accordance with a selected one of the plurality of signals from the oscillator means, the signal being selected in accordance with a number of pixel timing pulses required by the CCD image sensor to output a horizontal line of pixel image signals thereof; and a plurality of logic units adapted to generate horizontal and vertical CCD control signals from a logical combination of respective ones of the pixel clock, the timer signals, and the standard sync and control signals such that the horizontal and vertical CCD control signals are precisely referenced to the television standard and the pre-determined selected frequency is selected in accordance with a total number of pixels in a horizontal line of the CCD image sensor.

5. The logic system of claim 4 wherein the oscillator means comprises:

an oscillator operating at a frequency of 12 "fsc"; and a plurality of counters driven by the oscillator and adapted to produce output signals of respective frequencies which are multiples of the "fsc".

6. A logic system for controlling a charge coupled device (CCD) image sensor in accordance with a television standard, the logic system comprising:

an oscillator adapted to operate at a multiple of a standard frequency sub-carrier (fsc);

counter means driven by the oscillator for generating a plurality of output signals having respective frequencies referenced to the "fsc";

a timing generator adapted to be driven by a signal from the counter means and to generate standard sync and control signals in accordance with a television standard;

pixel clock generating means coupled to receive a selected one of the plurality of signals from the counter means, wherein the pixel clock generating means provides a pixel clock in accordance with a selected one of the plurality of signals from the counter means, the signal being selected in accordance with a number of pixel timing pulses as required by the CCD image sensor to output a horizontal line of pixel image signals thereof;

timer means coupled to receive standard signals from the timing generator for generating a plurality of pulses referenced to the standard signals and with precisely determined durations; and logic means coupled to the pixel clock generating means and the timer means for generating horizontal and vertical CCD control signals referenced to the standard signals such that the logic system is usable with any one of CCD image sensors having different numbers of image pixels for each horizontal line of pixels, and any of the CCD image sensors is cause to operate in accordance with the television standard.

7. The logic system of claim 6 wherein the logic means comprises:

a first logic unit coupled to receive as inputs the pixel clock and a plurality of pulses from the timer means, the first logic unit being adapted to generate from its inputs a pair of horizontal CCD control signals which are complements of each other;

a second logic unit coupled to receive as inputs a plurality of pulses from the timer means and a field indicator pulse, the second logic unit being adapted to generate from its inputs a pair of vertical CCD control signals which are complements of each other;

a four-bit counter coupled to receive as inputs a standard signal from the timing generator and a pulse from the timer means, the four-bit counter being adapted to generate in response to its inputs respective output signals; and a third logic unit coupled to receive as inputs the signals from the four-bit counter and a signal from the timing generator, the third logic unit being adapted to generate from its inputs another vertical CCD control signal and to generate the field indicator pulse inputted to the second logic unit.

8. The logic system of claim 6 wherein the counter means applies to the pixel clock generating means a plurality of signals having frequencies which are respectively up to six-times the "fsc", the "fsc" is 3.5795 MHz, and the selected signal applied to the pixel clock generating means has a frequency of 4 "fsc" to correspond with 791 pixels per horizontal line of the CCD image sensor.

9. The logic system of claim 7 wherein the timer means comprises:

a first timer coupled to the timing generator to receive as an input a standard signal, the first timer being adapted to generate a first pulse referenced to the input signal;

a second timer coupled to the first timer and adapted to generate a second pulse referenced to the first pulse;

a third timer coupled to the first timer and adapted to generate a third pulse referenced to the first pulse; and a fourth timer coupled to the timing generator to receive as an input another standard signal, the fourth timer being adapted to generate a fourth pulse referenced to the input signal, pulses from the four timers being coupled to respective ones of the four-bit counter and the three logic units.

10. An electronic imaging system comprising:

a charge coupled device (CCD) image sensor;

a video display; and logic means for interfacing the CCD image sensor and the display so as to provide simultaneous and precisely timed sync and control signals for the CCD image sensor and for the display in accordance with a television standard, the logic means comprising:

drive means for providing a system signal having a frequency referenced to a standard television frequency sub-carrier (fsc);

timing generator means for generating standard sync and control signals in accordance with a television standard, the generator means being controlled by the drive means;

pixel clock generating means for providing a pixel clock having repeating cycles each of which has a pre-determined number of pixel timing pulses in accordance with requirements of the CCD image sensor, the pixel clock generating means being controlled by the drive means; and timing and logic means being driven by ones of the standard sync and control signals for generating horizontal and vertical control signals for the CCD image sensor such that the horizontal and vertical control signals are precisely referenced to the standard sync and control signals, such that the logic system is usable with any one of a number of different CCD image sensors to provide video signals in accordance with a television standard.

wherein the drive means is adapted to provide a signal having a frequency of a pre-determined multiple of the "fsc" to the timing generator means and provides a plurality of signals having frequencies of multiples of the "fsc" to the pixel clock generating means; and wherein the pixel clock generating means is adapted to provide a pixel clock in accordance with a selected one of the plurality of signals from the drive means, the signal being selected in accordance with a number of pixel timing pulses required by the CCD image sensor to output a horizontal line of pixel image signals thereof.

* * * * *